May 19, 1964 W. O. GALONSKA 3,133,315
APPARATUS FOR FORMING FILAMENTARY MATERIAL FOR SLIDE FASTENERS
Filed June 29, 1961 3 Sheets-Sheet 1
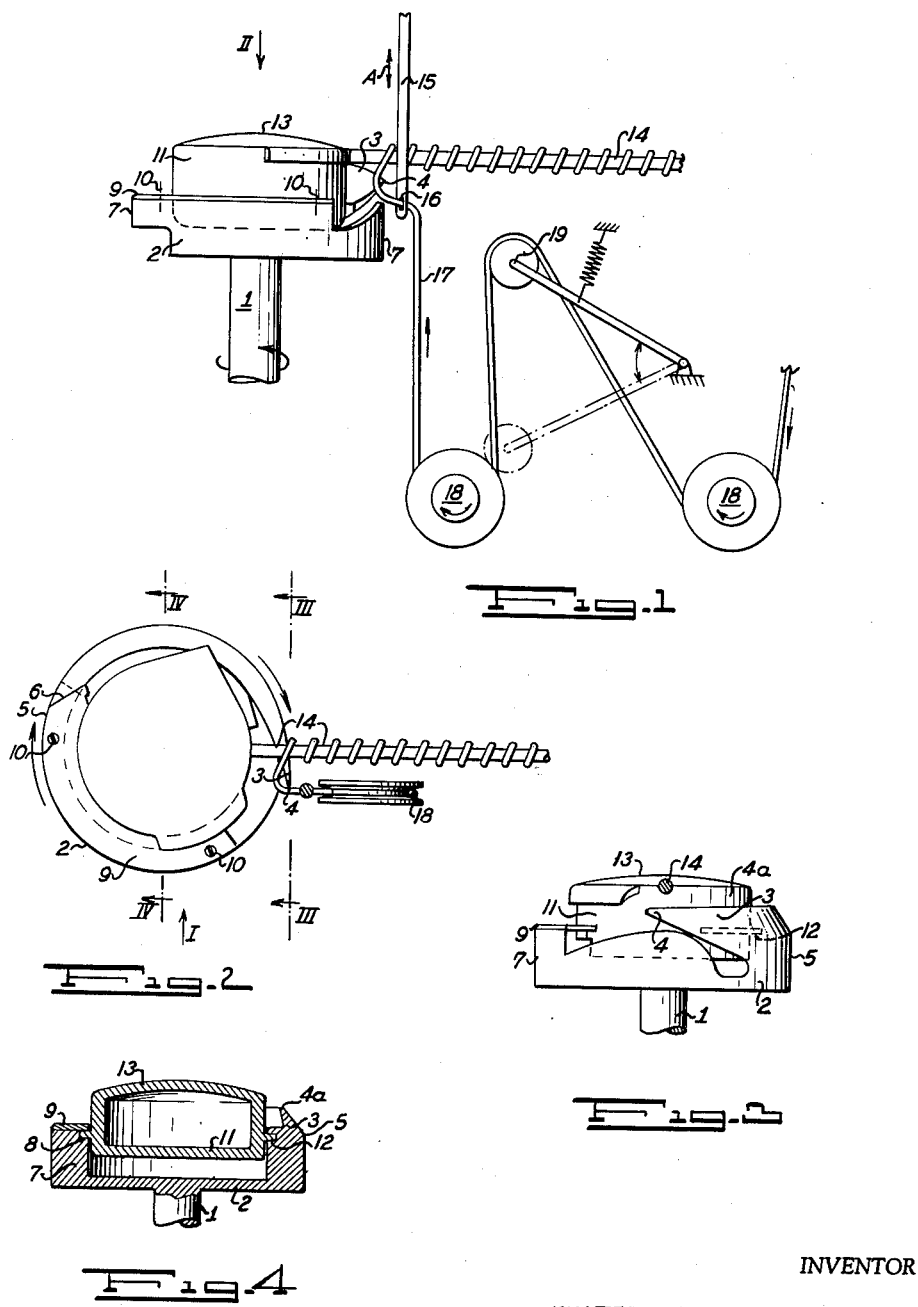
INVENTOR
WALTER OTTO GALONSKA May 19, 1964 W. O. GALONSKA 3,133,315
APPARATUS FOR FORMING FILAMENTARY MATERIAL FOR SLIDE FASTENERS
Filed June 29, 1961 3 Sheets-Sheet 2

INVENTOR
WALTER OTTO GALONSKA

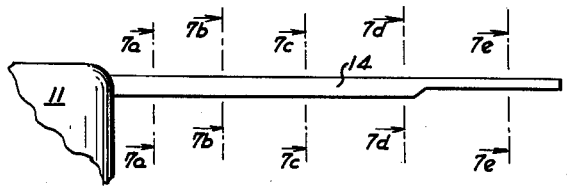
    
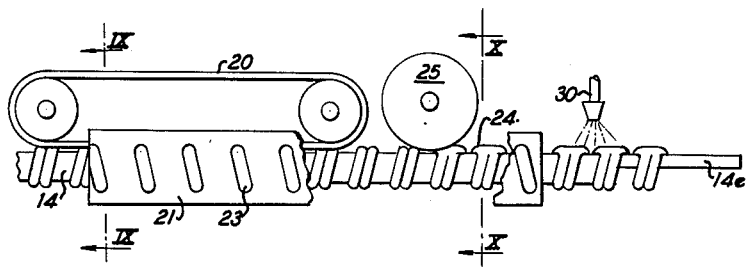
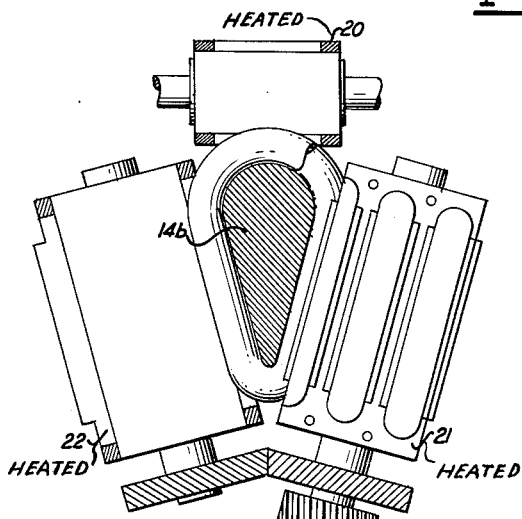
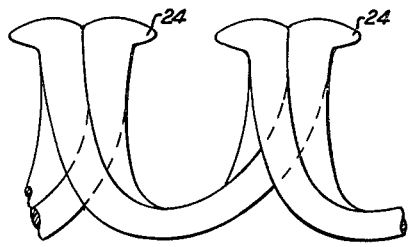
INVENTOR
WALTER OTTO GALONSKA United States Patent Office 3,133,315
Patented May 19, 1964

3,133,315
APPARATUS FOR FORMING FILAMENTARY
MATERIAL FOR SLIDE FASTENERS
Walter Otto Galonska, Frankfurt am Main, Germany, assignor to Talon, Inc., Meadville, Pa.
Filed June 29, 1961, Ser. No. 120,700
19 Claims. (Cl. 18—19)

The present invention relates to apparatus for forming coils of filamentary material, more particularly for producing the stringers of slide fasteners.

In the manufacture of slide fasteners, it is known to produce the stringer elements from continuous lengths of wire or the like by shaping the continuous lengths into serpentine or helical coil form. In the case of helical coil stringers, the shaping into coil form has been carried out hitherto with known winding devices the output of which is limited quantitatively by the need for guiding the filamentary wire or thread as it is unwound from a supply toward the winding device.

It has now been found that a device similar to the rotary stitch loopers of conventional sewing machines is particularly useful for producing helical coils from continuous lengths of filamentary material. The device comprises a bail or catcher integral with a rotary guide hood, and it is used in combination with a reciprocating thread guide or needle movable parallel to the axis of rotation of the hood and bail and with a radially extending guide mandrel positioned ahead of the needle closely adjacent thereto in the direction of rotation of the hood and bail.

By means of this device, a continuous length of filamentary material, fed from a supply reel over tensioning means to the eye of the needle, and having its free end attached to the guide mandrel, is looped successively around the guide mandrel each time it is grasped by the bail and conveyed around the hood, thereby forming a succession of helical coil turns on the mandrel. The guide mandrel is preferably provided with conveyor rollers or bands for conveying the coils along the mandrel away from the coiling device toward a delivery point. The speed of the rollers or bands is matched to that of the bail and hood.

The device is particularly suitable for use in the manufacture of continuous helical coils of thermoplastic filamentary materials for further working into stringers of slide fastener elements. For this particular use the conveyor rollers or bands are preferably provided with slots or grooves spaced from each other correspondingly to the desired spacing of the successive turns of the helical coils for correctly maintaining this spacing. Heating means are provided in conjunction with the conveyor bands or rollers for raising the thermoplastic material to deformation temperature, promptly followed by cooling means for imparting permanent, tension-free deformation closely surrounding the guide mandrel.

In accordance with a known procedure, the permanently deformed filamentary material in the shape of successive helical coils can be further deformed at the delivery end of the mandrel to define locking lugs on one side and a relatively flat margin on the other, by reducing the cross-section of the mandrel and applying heat and pressure to the coils.

The invention will be more readily understood from the accompanying drawings wherein:

FIGURE 1 is a side elevation of a portion of the apparatus for carrying out the invention;

FIGURE 2 is a plan view of FIGURE 1;

FIGURE 3 is an elevation of a portion of FIGURES 1 and 2 viewed in the direction of arrows III—III of FIGURE 2;

FIGURE 4 is an axial section on IV—IV of FIGURE 2;

Figure 5A:
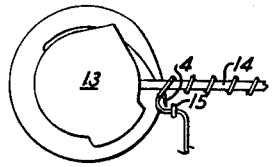
Figure 6A:
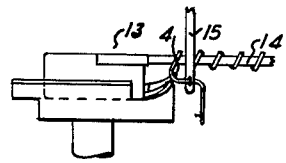
Figure 5B:
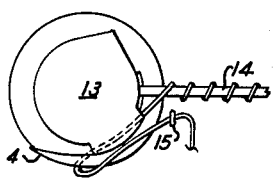
Figure 6B:
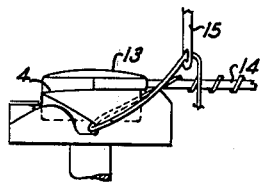
Figure 5C:
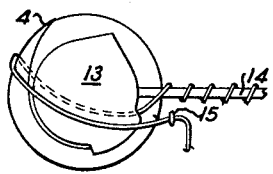
Figure 6C:
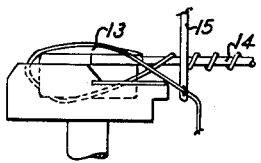
Figure 10:
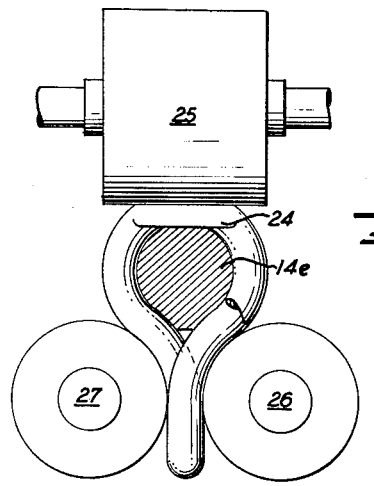

FIGURES 5a–5c and 6a–6c respectively are plan views and side elevations illustrating different relative positions of the parts shown at the left of FIGURE 1;

FIGURE 7 is a side elevation of a guide mandrel with different sections thereof illustrated in FIGURES 7a to 7e;

FIGURE 8 is a side elevation of the guide mandrel with conveyor belts;

FIGURE 9 is a cross-section taken on line IX—IX of FIGURE 8 at a greater scale;

FIGURE 10 is a cross-section on line X—X of FIGURE 8 at a larger scale and

FIGURE 11 is an enlarged view of a portion of two completed stringer elements.

The apparatus comprises a hood member 2 mounted on a drive shaft 1 and having a cylindrical body portion 7 with a bail or catcher 3 extending therefrom. The bail 3 is provided with a tip 4 extending slightly outward beyond the cylindrical envelope of the hood body. The bail body 4a as seen in FIGURE 3 lies higher than the marginal edge 5 of the hood and is connected by a ramp 6 to the edge 5 of the hood 2.

The interior of the hood body 7 is provided with a groove 8 on the hood body 7 at a portion of its periphery recessed or cut back at the level of the upper edge of the groove 8, there being a peripheral annular segment 9 filling this cut back portion and releasably secured by screws 10. The hood 2 is rotated in the direction of forward movement of the bail tip 4.

A body member 11 is mounted inside the hood body and guided by an integral rib 12 extending into the groove 8. The external diameter of the body member 11 is somewhat less than the internal diameter of the hood body 7. The clearance provided between the hood body 7 and the cylindrical surface of the body member 11 is carefully dimensioned to be slightly greater than the maximum thickness of filamentary material to be worked in the apparatus.

The height of the body member 11 and the level of the integral rib 12 are so dimensioned as to provide a space between the bottom of the hood 2 and the bottom of the body member 11 and so that the slightly curved top surface 13 of the body member 11 extends somewhat higher than the trailing end of the bail 3.

The body member 11 supports a radially extending guide mandrel 14 in the form of a rod or needle removably secured to the body member 11 at the level of the curved top 13 and therefore above the bail body 4a. The flange or rib 12 is relieved at the vicinity of the mandrel 14.

At a small distance from the hood 2 there is provided a thread guide or needle 15 extending in a direction parallel to the axis of the hood, and the needle is operatively connected to means not shown for reciprocating it in the direction of the arrows A. The reciprocation of the needle 15 is related to the rotation of the hood 2, preferably by common drive means for actuating these parts in synchronism. The timing is such that the needle 15 is at its low point shown in FIGURES 1 and 6a when the bail tip 4 intersects the axial plane of the hood 2 containing the needle 15.

At its lower end the needle 15 has an eye 16 through which the filamentary material 17 is guided. The material 17 is supplied from a supply reel, not shown, over braking pulleys 18 and a spring loaded tensioning pulley 19 whereby the material is automatically tensioned as desired during the reciprocations of the needle 15.

The mandrel 14, which is of desired cross-section, extends between two lateral conveyor belts 21 and 22 and in upper belt 20.

The elements so far described correspond substantially to some of the conventional elements of a sewing machine with the exception that the mandrel 14 and the conveyor belts 21 and 22 are not found in sewing machines. Furthermore, the rotary shuttle ordinarily found inside the body member 11 is omitted and the body member 11 has a closed top surface.

The mandrel 14 is substituted for the underneath thread of a sewing machine and, since there is no material being stitched by the needle 15, the rotating hood and bail 3, at each rotation around the body member 11, wraps the filamentary material 17 around the mandrel 14.

FIGURES 5a–5c and 6a–6c clearly illustrate the consecutive positions of the parts whereby the material 17 is gradually wrapped around the mandrel 14 in the form of successive helical coils.

The helical coils formed on the mandrel 14 are conveyed along the mandrel by conveyor belts 20, 21 and 22. If the filamentary material 17 has a natural resiliency or resistance to helical deformation, it is necessary to provide means for preventing it from springing away from the mandrel. For this purpose the conveyor belts 20, 21 and 22 are provided with slots or grooves 23 which determine the direction and sequence of the coils. The conveyor belts 20, 21 and 22 are provided with heating means for destroying the natural resilience of the filamentary material. This is of particular importance when the apparatus is used for forming from thermoplastic material a helical coil which is to be used in the manufacture of stringer elements for slide fasteners. With a material of this nature, the natural resilience can be completely destroyed at the location of the conveyor belts 20, 21 or 22 so that the formed helical coil is further conveyed in the form which has been imparted thereto.

FIGURE 8 illustrates further apparatus for working the shaped helical coil into consecutive stringer elements of a slide fastener. In this figure the material is shown as a dual filament whereas in the preceding figures a single filament is disclosed. This does not materially affect the apparatus. FIGURE 8 illustrates a forming roller 25 for deforming the consecutive coils as they issue from the heating zone of the conveyor belts 20, 21 and 22, thereby forming interlocking head portions 24. FIGURE 7 illustrates the gradual transition of the mandrel 14 through its cross-sections $a$ to $e$ up to its tip 14$e$, and FIGURE 9 is a cross-section corresponding to portion $b$ of the mandrel 14.

When the stringer elements are to be used in a conventional manner by stitching them onto tapes, it is important that the portions of the coils diametrically opposed to the head portions 24 be rotated by 90°. This is obtained by providing underneath the crushing roller 25 a pair of rollers 26 and 27 as illustrated in FIGURE 10. The 90° rotation of these portions of the coils which lie below the cross-section $e$ of the mandrel 14 provides a relatively planar margin of successive loops of filamentary material which is readily stitched to a stringer tape. One of these loops and the beginning of a further loop on each side is illustrated in FIGURE 11. It is to be understood that the same effect can be obtained with a mono-filament as is illustrated in the dual filament of FIGURE 11.

Depending upon the nature of the thermoplastic material, it may be desirable to cool it positively as it issues from the last crushing zone, and this is readily done by a small jet of cool air adjacent the extreme right of FIGURE 8, as indicated at 30.

The mandrel 14, as indicated above, is releasably secured to the body member 11 for easy replacement by other rods of different size as determined by the dimensions of the stringer elements to be produced.

What is claimed is:

1. Apparatus for producing geometrically periodical structures of filamentary material comprising a stationary member, a rotary member mounted for rotation relative to the stationary member axially thereof, a guide rod having one end affixed to said stationary member and extending outwardly therefrom substantially perpendicular to the axis of said stationary member, a thread catcher arranged on the rotary member, means for rotating the rotary member, and means for periodically feeding a loop of filamentary material into the path of movement of the thread catcher, whereby each loop is carried around the stationary member and deposited on the inner end portion of the guide rod.

2. Apparatus as in claim 1 further comprising conveyor means associated with the guide rod for conveying successive loops along the guide rod toward the outer end thereof away from the stationary member.

3. Apparatus as in claim 2 further comprising spacing means associated with the conveyor means for predetermining the spacing between adjacent loops.

4. Apparatus as in claim 1 including heating means for heating the loops while the same are disposed on the guide rod.

5. Apparatus as in claim 4 further comprising conveyor means associated with the guide rod for conveying successive loops along the guide rod away from the stationary member.

6. Apparatus as in claim 4 wherein the heating means is structurally positioned to heat the conveyor means.

7. Apparatus as in claim 5 wherein the heating means comprises heating elements incorporated in the conveyor means.

8. Apparatus as in claim 1 wherein the cross-section of the guide rod varies lengthwise thereof for varying the cross-sectional shape of the loops progressively along the guide rod.

9. Apparatus as in claim 8 wherein the successive cross-sections of the guide rod merge gradually from each to the next.

10. Apparatus as in claim 8 wherein the cross-section of the guide rod remote from the stationary member is substantially less than that adjacent the fixed member.

11. Apparatus as in claim 10 further comprising a pair of squeeze rolls for compressing into substantially planar configuration the excess of loop cross-section over guide rod cross-section.

12. Apparatus as in claim 1 further comprising a crushing roller associated with the guide rod for flattening a portion of the successive loops.

13. Apparatus as in claim 1 further comprising tensioning means for yieldably resisting traction exerted by the thread catcher on the loops fed thereto.

14. Apparatus for producing connected fastener elements for slide fasteners from a continuous length deformable filamentary material including, in combination, a cylindrical body member, a circular member mounted concentrically with said body member for rotation relative thereto, an elongated forming mandrel having one end thereof affixed to said body member and extending outwardly therefrom substantially perpendicular to the axis of rotation of said circular member, a filament catcher arranged on the periphery of said rotary member, a reciprocating member for feeding a loop of filamentary material into the path of movement of said filament catcher on each revolution of said circular member whereby a loop of filamentary material is carried around the body member and disposed around the inner end portion of said mandrel on each revolution of the circular member so that a series of spaced apart coils are successively formed from the filamentary material and positioned on said mandrel.

15. The combination as defined in claim 14, including means for moving the series of spaced-apart coils along the mandrel to the outer free end thereof from which they are successively delivered.

16. The combination as defined in claim 14, including means arranged adjacent said mandrel and which in cooperation therewith is adapted to form an interlocking head portion on each of the coils as they are moved therealong.

17. The combination as defined in claim 14, wherein the cross-section of mandrel varies from the inner end to the outer free end thereof for varying the cross-sectional shape of the coils as they are progressively moved therealong and means arranged along the side of said mandrel which in cooperation therewith deform the coils successively as they move therealong.

18. The combination as defined in claim 14, including means for compressing into substantially planar configuration the excess of loop cross-section of each of said coils over the mandrel cross-section extending from the mandrel as the coils are moved therealong.

19. The combination as defined in claim 14, including means arranged along the side of said mandrel for heating the formed coils as they are moved therealong so as to set the shape of the same.

References Cited in the file of this patent

UNITED STATES PATENTS

| | | |
|---|---|---|
| 1,547,646 | Frederick | July 28, 1925 |
| 2,245,758 | Chernack | June 17, 1941 |
| 2,817,206 | Schwartz | Dec. 24, 1957 |
| 2,878,514 | Nichols et al. | Mar. 24, 1959 |
| 2,973,554 | Hansen | Mar. 7, 1961 |
| 2,035,307 | Yoshida | May 22, 1962 |

FOREIGN PATENTS

| | | |
|---|---|---|
| 1,051,991 | France | Jan. 20, 1954 |